Aug. 17, 1926.

H. O. HEM 1,596,354

RECORDING SCALE

Filed Dec. 10, 1919  3 Sheets-Sheet 1

Aug. 17, 1926.

H. O. HEM 1,596,354

RECORDING SCALE

Filed Dec. 10, 1919      3 Sheets-Sheet 3

Witnesses
H. H. Lybrand
C. E. Wilcox

Inventor
Halvor O. Hem
By George R. Frye
Attorney

Patented Aug. 17, 1926.

1,596,354

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

RECORDING SCALE.

Application filed December 10, 1919. Serial No. 343,810.

My invention relates to recording scales and is particularly designed for use with automatic scales. In the illustrated embodiment I have shown an automatic scale mechanism of the pendulum type arranged to revolve an indicating dial and type wheel from which printed records can be made, and associated with this automatic mechanism is provided a beam scale mechanism arranged to augment the weighing capacity of the scale and actuate a type wheel contiguous to the type wheel of the automatic mechanism so that a printed record can be obtained of the total weight offset by the two mechanisms. Thus, the beam scale mechanism can be graduated in capacities equal to that of the automatic mechanism so that the integral portions of the weight can be offset on the beam scale mechanism and the fractional portions thereof offset by the automatic scale.

Among the principal objects of my invention are the provision of a recording scale of simple and practical construction which will accurately register or record the weights of articles weighed on the scale; the arrangement of automatic weight-offsetting mechanism to counterbalance fractional portions of weight over and above the weight offset by the beam and poise mechanism, and actuating a type wheel mounted adjacent a type wheel actuated from the beam and poise mechanism to permit the printing of the fractional weight portions as continuations of the same printed figure of which the beam operated type wheel supplies the initial digits; and the provision of positive aligning means for both type wheels to insure the straight printing of the weight records and serving as locking means for holding the type wheels stationary at the moment of printing.

Other objects and advantages will be apparent from the following description in which reference is had to the accompanying drawings illustrating a preferred embodiment of my invention and in which similar reference numerals designate similar parts throughout the several views.

In the drawings:—

Figure 7 is a detail section showing in plan the arrangement of the pendulums of the automatic scale mechanism; and Figure 8 is a detail view showing the means provided for locking the type wheels and aligning the type at the moment of printing.

Figure 1:
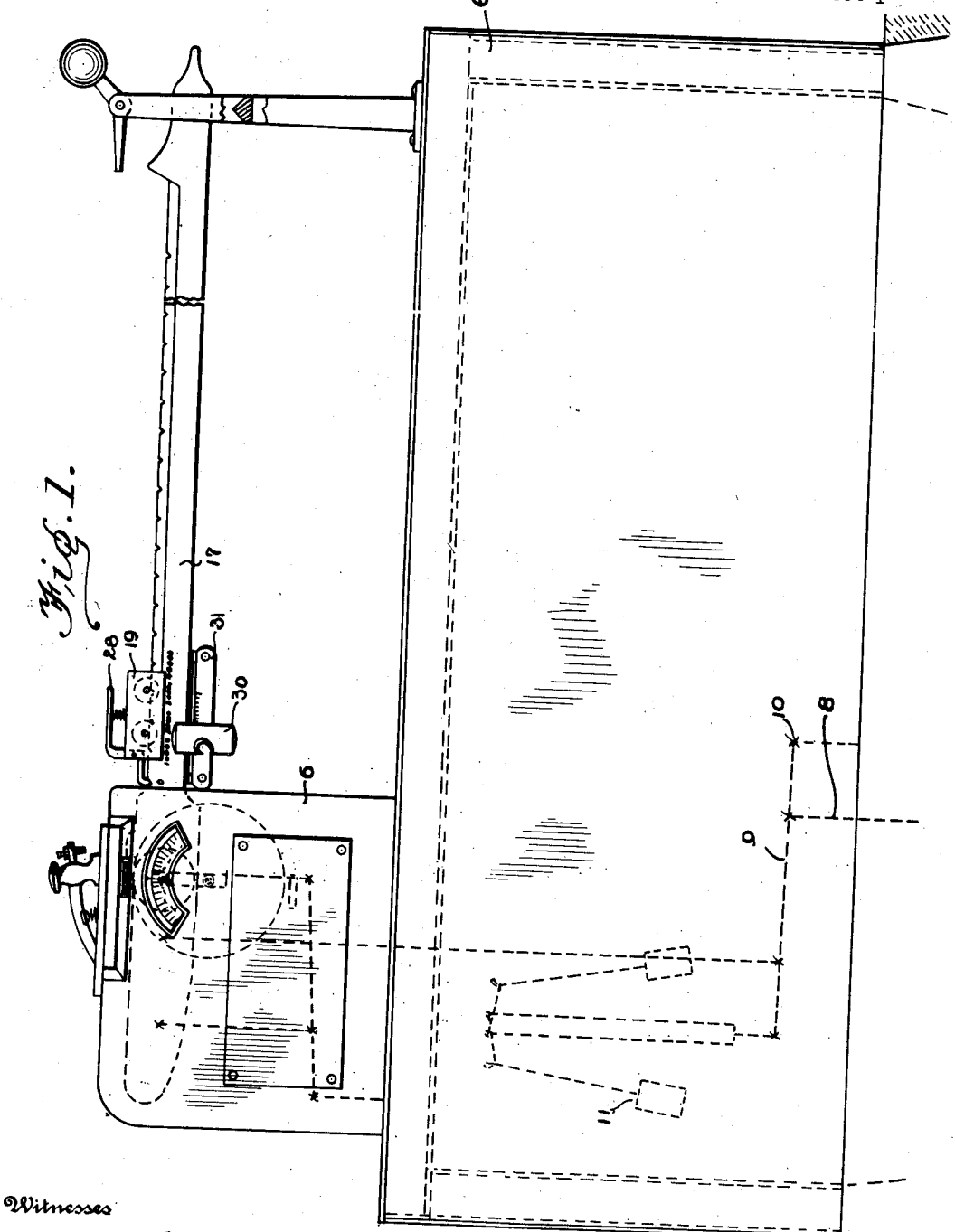
Figure 1 is a front elevation of the upper portion of a weighing scale equipped with my improved invention.

Referring to the drawings, 5 designates a casing arranged adjacent the platform mechanism of a scale and enclosing the pendulum offsetting means and levers of the automatic scale mechanism, and supporting a housing 6 enclosing the type wheels and indicating means of the automatic scale mechanism, as well as the type wheel and associated sections of the beam scale mechanism.

Any suitable platform and platform lever mechanism may be employed in connection with my improved scale, the weighing mechanism herein shown being designed to satisfactorily operate when employed in various kinds of scales, as, for example, in portable, dormant, or railroad track scales. For this reason no platform and leverage system is herein shown, but it is assumed that suitable platform lever mechanism will be connected, as by the steelyard 8, with the lower shelf lever 9 of my improved scale. The lever 9 is preferably fulcrumed adjacent one extremity on brackets 10, and connects at its other extremity with the pendulums 11 forming the automatic scale offsetting mechanism. These pendulums are preferably mounted in bearings 12 supported from a bracket 13 fixed upon the housing 5, the power arms of the pendulums being shown as overlapping and being connected through rods 14 with a crossbar 15 pivoted to the lever 9. It will be understood that this construction, while preferred, is not essential. Intermediate its ends the lever 9 connects with a vertical link 16 through which force is transmitted to the beam 17 of the beam scale mechanism. Thus, the weight of an article placed upon the scale platform will be transmitted through the steelyard 8 and lever 9 to the pendulums of the automatic scale mechanism and also the beam of the beam scale mechanism. The beam 17 is fulcrumed upon brackets 18 enclosed within the housing 6, and on the other side of the fulcrum bearings from the point of connection with the link 16 is provided the poise 19, adapted to travel lengthwise of the beam in the usual manner. The poise 19 is provided on its rear side with an arm 20 in which is swiveled a threaded sleeve 21 surrounding the spirally-threaded rod 22 which is suitably mounted to rotate in bearings 23 and carries at one extremity a bevel pinion 24 adapted to mesh with the bevel gear 25 on one end of the shaft 26. Adjacent the other end of the shaft is arranged the type wheel 27.

Figure 2:
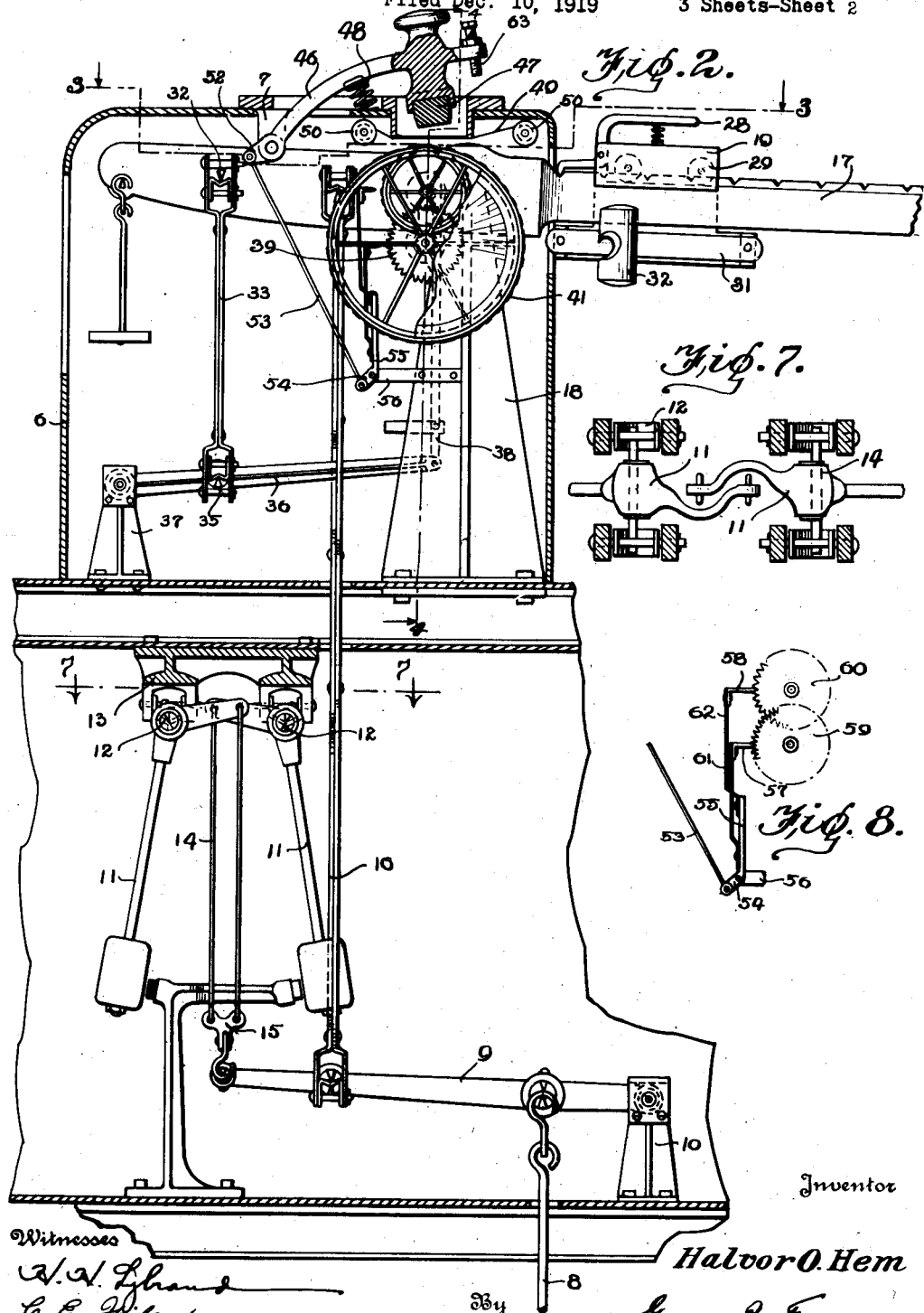
Figure 2 is an enlarged vertical section therethrough and showing the relative positions of the automatic and beam scale mechanisms adjacent the printing wheels.
Figure 3:
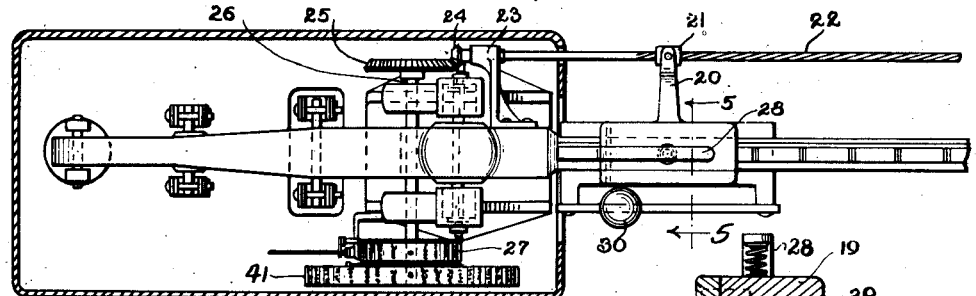
Figure 3 is a detail section taken substantially on the line 3—3 of Figure 2.
Figure 5:
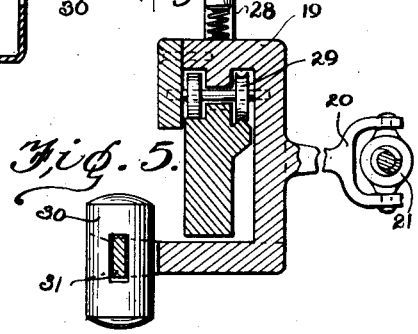
Figure 5 is a detail cross-section on the line 5—5 of Figure 3.

By the above construction I provide a beam and poise mechanism wherein the poise can readily be shifted longitudinally of the beam and during such shifting movement the type wheel 27 will be revolved to indicate the amount of weight offset by the poise in its new position, the figures on such type wheel being of course arranged so that the type corresponding to the position of the poise will be immediately below the printing hammer, as will be hereinafter described. A suitable spring-pressed latch 28 may be provided for holding the poise 19 in any desired position, and, for ease in sliding, the poise may be provided with rollers 29, substantially as shown in Figures 2 and 5. A subsidiary poise 30 can, if desired, be mounted upon a graduated auxiliary beam 31 carried by the main poise.

A pivot 32 is mounted in the beam 17 rearwardly of its fulcrum, substantially as shown in Figure 2, and contacts with the upper extremity of a thrust bar 33, the lower extremity of which impinges upon the pivot 35 mounted intermediate the ends of the auxiliary lever 36. This auxiliary lever is preferably fulcrumed at one end upon a bracket 37 mounted on the casing 5 and at its other end is pivotally connected with the rack rod 38 (see Figures 2 and 4,), meshing with the pinion 39 fixed on the shaft 40 which carries adjacent its forward extremity the type wheel 41 bearing on its periphery the printing numerals arranged to position the numerals corresponding to the weight offset by the pendulums 11 directly under the printing hammer at all positions of the pendulums. If desired, an indicating chart 42 may be arranged to revolve with the type wheel 41 and be visible to the operator through a window 43, in the usual manner of automatic scales, a lining wire or pointer 44 serving to fix the particular indication to be read.

It will be noted that the periphery of the type wheel 41 is so positioned that at the point where the printing impression is made the type numerals of the wheel 41 are in the same horizontal plane with the type numerals of the type wheel 27 actuated from the beam scale mechanism, and the two wheels are arranged in juxtaposition so that a simultaneous impression can be made of the aligned numerals on each type wheel to form a single indication, if desired. Thus, the arrangement may be such that the automatically actuated wheel 41 will register fractions of pounds indicated as common or decimal fractions or in terms of ounces. Or the automatically actuated wheel may also register weights up to but not including ten, one hundred or one thousand pounds, while hundreds, thousands and tens of thousands respectively are registered by the poise actuated wheel 27, and the record made from the aligned type numerals of the type wheels 27 and 41 will show a single figure, of which the type wheel 27 actuated from the beam weighing mechanism supplies the initial digit or digits and the type wheel 41 actuated from the pendulum weighing mechanism supplies the remainder of the figure.

Figure 4:
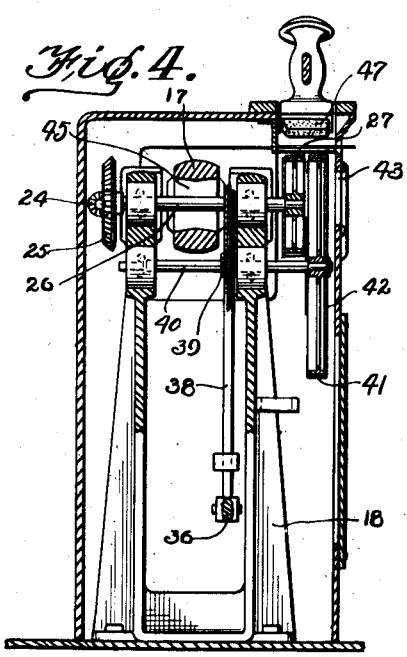
Figure 4 is a vertical cross-section taken substantially on the line 4—4 of Figure 2.
Figure 6:
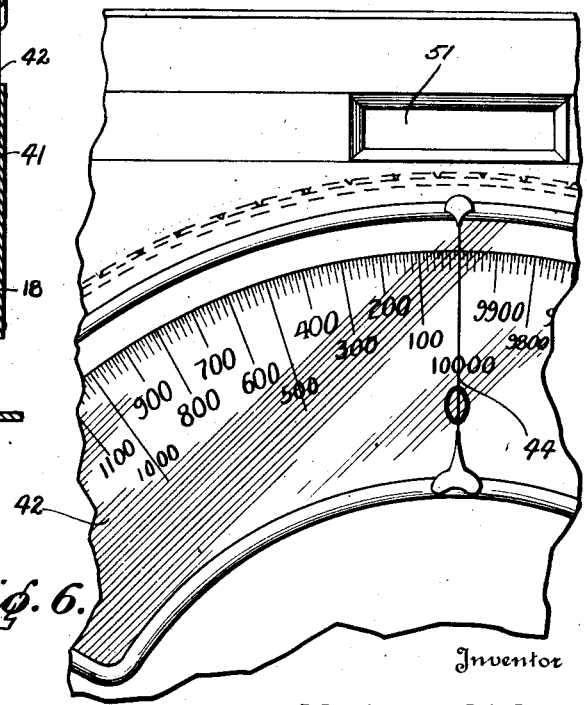
Figure 6 is an enlarged front elevation showing a portion of the chart indicating means of the automatic scale mechanism and the opening for insertion of the tickets to be printed.

The shafts carrying the type wheels are preferably mounted in ball or other anti-friction bearings in the bracket 18 and an opening, as 45, is cut in the beam 17 of sufficient diameter to allow the swinging of the beam without contacting the shaft 26 (see Figure 4).

Any desired means may be provided for effecting an impression from the type wheels upon a card, tape, or a plurality of sheets, cards or tapes, according to the desires or necessities of the scale operator. In the illustrated embodiment I have shown by way of example one constructoion whereby a printed impression can be obtained upon a card or sheet that is inserted whenever it is desired to secure a record of the weight offset. A printing hammer 46 is pivotally mounted upon the housing 7 and carries a platen 47 of rubber or other desired material directly above the aligned numerals of the type wheels 27 and 41 (see Figure 2). A spring 48 is arranged to maintain the printing hammer in raised position except when depressed by the operator. Directly above the type numerals is positioned an inking ribbon 49 mounted to unwind and wind upon rollers 50 in the familiar manner of inking ribbons, and an opening, as 51, is arranged in the housing 6 for the insertion of a card or sheet between the ribbon 49 and the platen 47 of the printing hammer. By depressing the printing hammer a printed record of the aligned type numerals is made upon the inserted card.

To insure the receipt of a straight line record of the type numerals of the type wheels 27 and 41 respectively and not a straggling group of digits, means are provided to align the type numerals nearest the point of impression of the printing hammer immediately prior to making the printed impression. As herein shown, the printing hammer 46 is provided with an arm 52 (see Figure 2) to which is pivoted one end of a link 53, the other end of which is connected with one arm 54 of a lever 55 pivoted intermediate its ends on an arm 56 extending from the bracket 18 and carrying on its other arm a pair of pawls 57 and 58 respectively (see Figure 8) adapted to engage in the teeth of the star wheels 59 and 60, fixed on the same shafts which carry the type wheels 41 and 27 respectively. Preferably leaf springs 61 and 62 are arranged between the pawls and the lever 55 to permit flexibility of operation to take up any shock of impact of the pawls of the star wheels. The teeth of the star wheels are so arranged relatively to the type numerals on the type wheels with which they revolve that when the pawl seats between the teeth the type numerals are accurately aligned at the point immediately below the printing hammer. The connection of the rod 53 between the printing hammer and lever 55 and the arrangement of the pawls adjacent the star wheels are such that the pawls contact the star wheels and align them just before the platen 47 contacts the card to be printed. It will be noted also that the pawls remain in engagement with the teeth of the star wheels at the moment of printing, thereby locking the type wheels to prevent accidental rotation. The release of the printing hammer automatically releases the pawls from the star wheels. An adjusting screw 63 may be mounted on the printing hammer in position to contact the housing 6 to limit the travel of the printing hammer and prevent too great impact upon the type wheels.

The operation of the invention is believed to be apparent from the above description. When a weight is placed upon the scale platform the platform levers impart a downward pull to the steelyard 8 and bench lever 9, which is transmitted directly to the pendulums 11 and through the link 16 to the beam 17 of the beam scale mechanism. By moving the poise on the beam to a point offsetting the bulk of the weight, the remainder of the weight of the article on the scale platform will be offset by the swinging of the pendulums in the well-known manner of pendulum automatic scales. When the poise is moved outwardly on the beam the spirally-grooved rod 22 is revolved, rotating the type wheel 27 through the bevel pinion 24 and gear 25, positioning immediately below the printing hammer the type numerals depicting the weight offset by the poise in its new position. The position of the pendulums controls the indication on the type wheel 41, which is revolved to move into position immediately below the printing hammer the type numerals showing the weight offset by the pendulum weighing mechanism.

The combined weights offset by the beam weighing mechanism and the pendulum weighing mechanism are accordingly shown when an impression is made of the aligned type numerals on the type wheels.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. The combination in a scale, of weighing mechanism, including pendulum load-counterbalancing mechanism, auxiliary lever mechanism for varying the capacity of the scale, type wheels, means whereby said type wheels are separately actuated from the pendulum and lever mechanism, and means coacting with said type wheels for printing a record weight from a combination of characters on the said wheels.

2. The combination in a scale, of a stationary frame pendulum-controlled automatic weighing mechanism supported thereby, mechanism for changing the capacity of said scale, type wheels mounted on said stationary frame and arranged in juxtaposition to permit printing a record weight from a combination of characters on the several wheels and means for separately actuating said type wheels from said weighing and capacity-changing mechanisms.

3. The combination in a recording scale having an automatic weighing mechanism and a beam weighing mechanism, of recording type wheels separately actuated from said weighing mechanisms and arranged in juxtaposition to permit simultaneous printing of the combined weights offset by the respective mechanisms.

4. The combination in a recording scale having a pendulum-controlled automatic weighing mechanism and a beam weighing mechanism, of recording type wheels separately actuated from said weighing mechanisms and arranged in juxtaposition to permit simultaneous printing of the combined weights offset by the respective mechanisms.

5. The combination in a recording scale having an automatic weighing mechanism and a beam weighing mechanism, of a pair of recording type wheels separately actuated from said weighing mechanisms and arranged in juxtaposition to permit simultaneous printing of the combined weights offset by the respective mechanisms.

6. The combination in a recording scale having a beam weighing mechanism for offsetting one or more major divisions of a load, an automatic weighing mechanism for offsetting the remainder of the load, and recording type wheels separately actuated from said weighing mechanisms and arranged in juxtaposition to permit simultaneous printing of the combined weights offset by the respective mechanisms.

7. The combination in a recording scale, of automatic weighing mechanism, beam weighing mechanism, and printing mechanism including type wheels actuated respectively by said weighing mechanisms, means for locking said type wheels in printing position comprising star wheels fixed to said type wheels, and resiliently mounted pawls so connected to the printing mechanism as to be carried into engagement with the star wheels immediately before the printing operation.

8. The combination with a scale lever, of pendulum load-offsetting mechanism connected thereto, a scale beam, a link connecting said lever to said scale beam, an auxiliary lever, a thrust member connecting said beam to said auxiliary lever, a rack bar pivotally connected to said auxiliary lever, a pinion meshing therewith, and an indicating wheel revoluble with said pinion.

9. The combination in a recording scale, of beam scale weighing mechanism provided with a poise for offsetting a part of a load, automatic weighing mechanism for offsetting the remainder of the load, a type-carrying member actuated by movement of said poise, a type-carrying member actuated by movement of said automatic weighing mechanism, said members being in juxtaposition, and means for aligning the type of said members so that a single impression may be taken therefrom.

HALVOR O. HEM.